(12) United States Patent
Lemaire et al.

(10) Patent No.: US 8,033,210 B2
(45) Date of Patent: Oct. 11, 2011

(54) DEVICE FOR MANAGING THE DISPLACEMENT OF A HYDRAULIC MOTOR OR A GROUP OF HYDRAULIC MOTORS

(75) Inventors: Gilles G Lemaire, Margny les Compiègnes (FR); Jean-Pierre Adrien Souply, Senlis (FR)

(73) Assignee: Poclain Hydraulics Industrie, Verberie (FR)

( * ) Notice: Subject to any disclaimer, the term of this patent is extended or adjusted under 35 U.S.C. 154(b) by 643 days.

(21) Appl. No.: 12/088,956

(22) PCT Filed: Oct. 2, 2006

(86) PCT No.: PCT/FR2006/050971
§ 371 (c)(1),
(2), (4) Date: May 19, 2008

(87) PCT Pub. No.: WO2007/042703
PCT Pub. Date: Apr. 19, 2007

(65) Prior Publication Data
US 2008/0256939 A1    Oct. 23, 2008

(30) Foreign Application Priority Data
Oct. 3, 2005   (FR) ...................................... 05 10076

(51) Int. Cl.
*F01B 1/06* (2006.01)
*F03C 1/00* (2006.01)
(52) U.S. Cl. ................................ 91/491; 91/519; 60/468
(58) Field of Classification Search .................... 60/425, 60/428, 469; 91/491, 519
See application file for complete search history.

(56) References Cited

U.S. PATENT DOCUMENTS

| | | | | |
|---|---|---|---|---|
| 3,932,992 A | | 1/1976 | Martin | |
| 4,807,519 A | * | 2/1989 | Wusthof et al. | 91/519 |
| 4,898,076 A | * | 2/1990 | Bigo et al. | 91/491 |
| 6,050,173 A | * | 4/2000 | Sakai et al. | 91/491 |
| 6,099,273 A | * | 8/2000 | Allart et al. | 60/425 |
| 6,318,235 B1 | * | 11/2001 | Allart et al. | 91/519 |
| 6,338,247 B1 | | 1/2002 | Drin | |
| 7,185,579 B2 | * | 3/2007 | Allart et al. | 91/491 |

FOREIGN PATENT DOCUMENTS
FR   2 836 960   9/2003

OTHER PUBLICATIONS
International Search Report—PCT/FR2006/050071.
* cited by examiner

*Primary Examiner* — Thomas E Lazo
(74) *Attorney, Agent, or Firm* — Ladas & Parry LLP (57) ABSTRACT

A motor having two series of distribution ducts each having two groups of ducts. The displacement selector is able to occupy a large displacement position in which the first groups of distribution ducts of the first series are connected to a main duct while the second groups are connected to the other main duct, and a small displacement configuration in which the first group of distribution ducts of the first series is connected to a main duct, the second group of distribution ducts of the first series is connected to the other main duct and a bypass connection exists between the first and the second group of distribution ducts of the second series. The device has a restriction in order, in the small displacement configuration, to restrict this bypass connection.

30 Claims, 7 Drawing Sheets

DEVICE FOR MANAGING THE DISPLACEMENT OF A HYDRAULIC MOTOR OR A GROUP OF HYDRAULIC MOTORS

BACKGROUND OF THE INVENTION

The present invention relates to a device for managing the displacement of a hydraulic motor having at least two operationally active displacements and able to be connected to two main ducts, for admission and exhaust respectively, the motor comprising two series of ducts each having a first and a second group of distribution ducts, the management device comprising a displacement selector able to occupy at least a large displacement position in which the first groups of distribution ducts of the first and second series are connected to one of the main ducts, while the second groups of distribution ducts of the first and second series are connected to the other main duct, and a small displacement configuration in which the first group of distribution ducts of the first series is connected to one of the main ducts, while the second group of distribution ducts of the first series is connected to the other main duct and a by-pass connection is provided between the first group of distribution ducts of the second series and the second group of distribution ducts of the second series.

The hydraulic motor to which the inventive management device is applied can be used, for example, for the translational movement of a machine or the movement of a tool carried by a machine.

Generally speaking, the speed required for such hydraulic motors is becoming increasingly high, in particular to ensure rapid transfer of the machine between two sites for use of the latter, or for transfer of the tool between two working positions. These motors must therefore be capable of both generating a high torque in order to be able to correctly perform the functions of the machine or of the tool under working conditions, and having a high output speed, for the reasons indicated above.

In order to achieve these two aims, the admission to a hydraulic motor could be provided by a pump of very large dimensions, allowing in particular a high fluid delivery to drive the motor at high speed with a displacement allowing a high output torque to be obtained. However, it would be extremely costly to be forced in this way to over-dimension the pumps and, moreover, it is frequently a requirement that the noise and consumption are minimised for the drive motors of such pumps, which are generally diesel type heat engines or gas engines, something that is at variance with such over-dimensioning.

So, it is becoming necessary to allow the hydraulic motor to develop a high torque and to operate at high speed as a function of need, without over-dimensioning the pumps used to supply the motors or the heat engines that drive these pumps.

For these reasons, the hydraulic motor to which the invention is applied has two different displacements, in particular a large displacement developing a high torque for the working of the machine or the tool driven by this motor, and a small displacement allowing operation at higher speed. The constraints mentioned above mean that the small displacement is generally quite significantly reduced in relation to the large displacement, with the motor developing a low torque in this small displacement. In particular, the motor may even have three, or more, displacements, with the smallest displacement being used to ensure a rapid travel of the machine or the tool driven by this motor.

It is known that the braking of such a hydraulic motor can, at least in part, be performed in a hydrostatic fashion, by pressure build-up in the exhaust ducts. The hydrostatic braking efficiency obviously depends on the torque developed by the motor. However, as indicated above, in their smallest displacement, used for rapid travel, the motors develop a relatively low torque, so that there is a risk of the hydrostatic braking efficiency not being guaranteed at low displacement.

Moreover, as has also been indicated above, an effort is made to use, for driving the hydraulic motor feed pump, a less noisy heat engine that is as small as possible. A diesel motor fitted with a turbo-compressor is often used.

During hydrostatic braking, the pressure increases in the return branch of the pump, until it becomes higher than the pressure in the banking up branch, used to feed the motor. As a consequence, the hydraulic motor becomes a pump and the pump becomes a motor, thereby tending to drive the thermal engine which normally serves to drive it. The hydrostatic braking efficiency then depends on the holding torque that can be developed by this heat engine. However, the use of low noise and small dimension heat engines obviously limits the holding torque and the speed of rotation that they are capable of providing. As a consequence, the hydrostatic braking can subject the motor normally used to drive the pump to stresses for which the latter is not designed.

Similarly, and for this same reason, there is a risk of the hydrostatic braking not being properly ensured and/or damage to certain parts of the transmission. In order to limit the risks of damage to the heat engine driving the pump during hydrostatic braking, U.S. Pat. No. 6,338,247 proposes that the admission circuit of the hydraulic motor is fitted with holding valves which are normally open but which partially close when the pressure in the return branch increases too much under the effects of the hydraulic braking. This partial closure causes a loss of load in the return branch and avoids the pump being subjected to excessive pressures and the drive motor of this pump being excessively stressed.

These valves are fitted on the main ducts of the circuit, or at least on the duct that serves as the exhaust for the motor in forward gear. Moreover, if the motor is in small active displacement the braking torque is low and the braking is less efficient. In fact, this system aims to avoid damaging the pump and its drive motor but it does not solve the problem of the inadequate braking at low displacement.

The aim of the invention is to remedy the abovementioned disadvantages by proposing a device for managing the operation of a hydraulic motor that allows, despite the constraints mentioned above, hydrostatic braking to be ensured under favourable conditions, for a simple installation.

This aim is achieved thanks to the fact that the device of the invention comprises restriction means which are able, in the small displacement configuration, to restrict said by-pas connection.

In the small displacement configuration, only the distribution ducts of the first series normally contribute towards delivering the engine torque, since the first and second groups of these ducts are connected to the two different main ducts. So, the small displacement of the motor corresponds to that of the cylinders connected to these distribution ducts of the first series. On the other hand, the first and second groups of distribution ducts of the second series are normally by-passed by being connected together and are therefore at the same pressure such that the corresponding partial displacement is inactive.

According to the invention, in particular when a hydrostatic braking torque in addition to that which would be possible using only the small displacement is necessary, the abovementioned by-pass connection can be restricted. The first and second groups of distribution ducts of the second series are thus placed under different pressures, thereby generating a supplementary torque which is added to the torque generated by this small active displacement and thereby allowing the desired hydrostatic braking torque to be obtained without increasing the holding pressure at the pump. At the same time the motor remains active at small displacement since the first and second groups of main ducts of the first series remain connected, respectively, to each of the main ducts. The total holding torque obtained is therefore higher than that which the small displacement would allow, without restriction of the by-pass connection. The desired hydrostatic braking is therefore obtained without excessive stressing of the motor driving the pump with dissipation of the braking power in the hydraulic motor due to the fact that the by-pass connection is restricted.

The device according to the invention acts selectively on the small displacement, that is to say in the high speed configuration where the need for an additional holding braking torque exists.

It may be decided to integrate the inventive device into the motor, in which case it acts directly at the level of the distribution ducts thereby allowing a compact arrangement.

As a variant, the device of the invention can be external to the motor, acting on the connection between the main ducts of the motor and the main ducts of the circuit. In the latter case the inventive device can even be common to a number of motors, for example two motors on the same vehicle axle.

Advantageously, the device comprises a by-pass selector arranged in the by-pass connection which is able, from an initial position in which it allows a substantially freely open by-pass connection, to be displaced in order to restrict said connection by a restriction.

In its first position the by-pass selector can thereby allow normal functioning at small displacement, while it can be moved in order to restrict the by-pass connection when hydrostatic braking is necessary although the motor is operating at small displacement.

Advantageously, the by-pass connection comprises a first connecting section able to be connected to the first group of distribution ducts of the second series and a second connecting section able to be connected to the second group of distribution ducts of the second series, and the selector comprises a drawer arranged in a bore hole having at least a first and a second opening connected, respectively, with the first and the second connecting sections such that the drawer is able, depending on its position, to establish a substantially free communication or a restricted communication between said sections. These connecting sections may be within the motor, in the event that the inventive device is within the motor. Otherwise, these connecting sections are connected to the respective groups of distribution ducts via the intermediary of the main ducts of the motor to which these distribution ducts are connected.

The selector thus has a simple construction and is easily operated between its various positions.

Advantageously the device comprises a displacement selector which can occupy a large displacement position in which the first groups of distribution ducts are able to communicate together while the second groups of distribution ducts are able to communicate together and occupy a small displacement position in which the first group of distribution ducts of the second series is able to communicate with at least the second group of distribution ducts of the second series. The displacement selector may be internal or external to the motor or even, in the latter case, common to several motors.

Advantageously, said second groups of distribution ducts are able to communicate together in both displacement selector positions.

According to a first embodiment, the displacement selector and the by-pass selector are two different selectors, and in its small displacement position the displacement selector can establish the by-pass connection in which the by-pass selector is arranged.

The displacement selector can be designed and operated in the conventional way while the by-pass selector is operated solely when a restriction of the by-pass connection is necessary, particularly in order to ensure hydrostatic braking at small displacement.

According to another embodiment, the displacement selector and the by-pass selector form a common selector which can occupy a small displacement position with restricted by-pass in which said common selector establishes a restricted communication between the first group of distribution ducts of the second series and the second group of distribution ducts of the second series or between the first group of distribution ducts of the second series and the second groups of distribution ducts of the first and second series.

This common selector has the advantage of allowing an extremely compact design.

Advantageously, the common selector comprises a drawer in a bore hole having at least a first opening connected to the first group of distribution ducts of the first series, a second opening connected to the first group of distribution ducts of the second series and a third opening connected to the second group of distribution ducts of at least the second series; in the large displacement position, said common selector establishes a communication between said first and second openings, isolating these from the third opening; in the small displacement position, the common selector establishes a substantially free communication between the second and third openings isolating these from the first opening and, in the small displacement position with restricted by-pass, the common selector establishes a restricted communication between the second and third openings, isolating these from the first opening.

Advantageously, the displacement position with restricted by-pass is a position of the common selector that is in between the large and small displacement positions of said common selector.

In this case, the design and operation of the common selector can be particularly simple since, from the unrestricted small displacement position in which the by-pass connection is completely free, this connection is restricted in the intermediate position then, as the selector continues its movement, the by-pass connection can disappear in order to ensure large displacement operation.

Advantageously, the restriction of the by-pass connection varies progressively according to the position of the by-pass selector.

The restriction of the by-pass connection can also be in proportion, in particular to the necessary hydrostatic braking torque.

Advantageously, the second groups of distribution ducts of the first and second series are permanently connected together, and the by-pass selector comprises a drawer whose movement control means comprise on the one hand a control chamber connected to the first group of distribution ducts of the second series and on the other a return spring with an antagonistic effect on that of the pressure within said chamber.

So, depending on the calibration of the return spring, the by-pass connection can be automatically restricted when the pressure in the second groups of distribution ducts connected together increases under the effect of hydrostatic braking.

Advantageously, the device comprises a non-return valve able to allow an unrestricted connection between said first and second sections in the direction of circulation of the fluid from the first group of distribution ducts of the second series towards the second groups of distribution ducts.

In particular when the engine has a preferred direction of operation, such a non-return valve is advantageous for allowing short-circuiting of the restriction at small displacement, in the direction of circulation of the fluid corresponding to the non-preferred direction of operation of the motor.

Advantageously, the device has a mechanical brake for the moor and means of operating the motor braking able, when the motor is in small displacement operation, to operate in succession a restriction of the by-pass connection and activation of the mechanical brake.

When it is necessary to brake the machine or tool driven by the motor, for instance, first hydrostatic braking is ensured then, if necessary, additional braking by activation of the mechanical brake.

Advantageously, the device comprises means for operating the braking of the motor that are able, as a function of a braking command and motor operation parameters, to order an initial step of the braking in which the fluid delivery in the main ducts is modified (in particular by being lowered by a reduction in the lower displacement of the pump) and, as a function of the operating situation of the motor at the end of this initial step, to operate at least a second braking step in which the by-pass connection is restricted, allowing in particular limitation of the maximum pressure in the return branch.

Advantageously, the device has means for controlling the position of the by-pass selector that are able, when there is a braking command, to order the movement of said selector so as to control a variable representative of the operation of a vehicle driven by the motor according to a set-point.

BRIEF DESCRIPTION OF THE DRAWING FIGURES

The invention will be properly understood and its advantages will be better illustrated by reading the detailed description that follows of embodiments given as non-restrictive examples. The description refers to the appended drawings, in which.

DETAILED DESCRIPTION OF THE PREFERRED EMBODIMENTS

Figure 1:
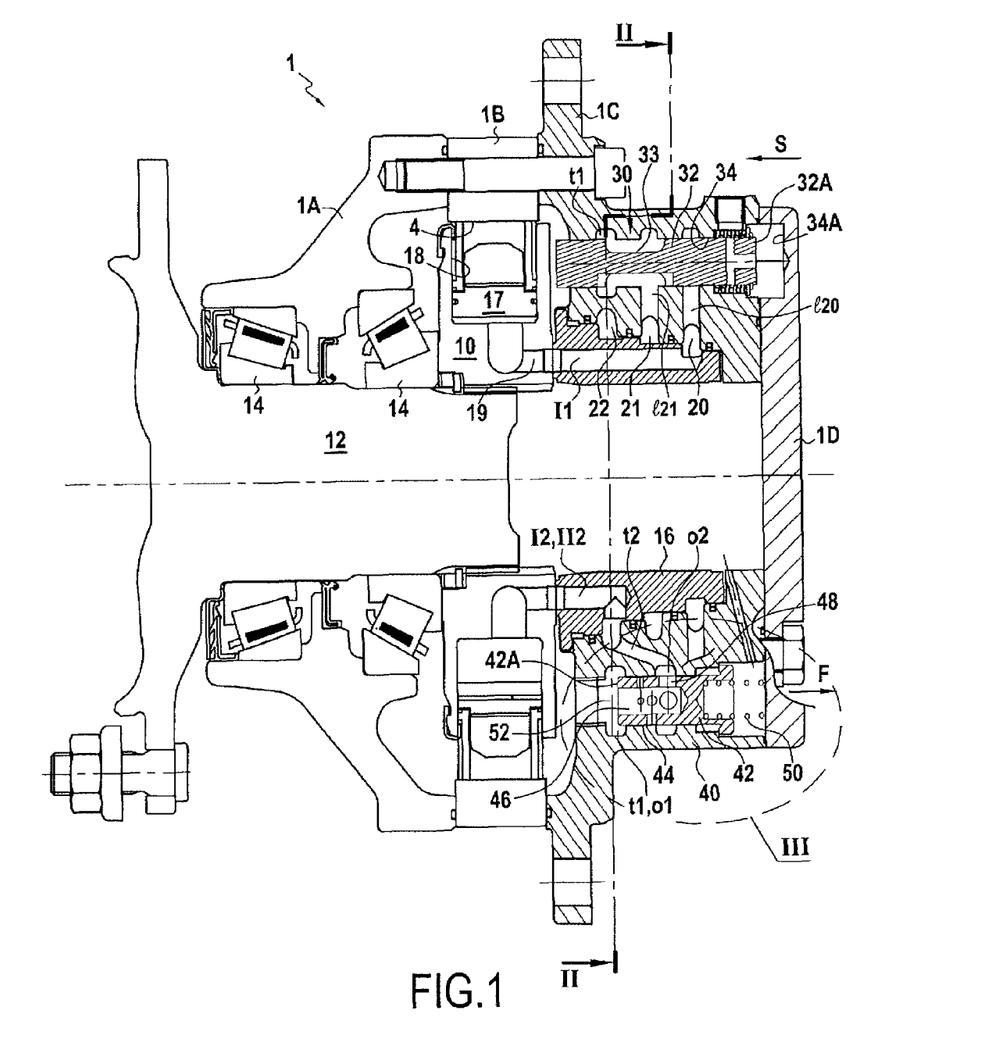
FIG. 1 is an axial cutaway view of a hydraulic motor fitted with a management device according to the invention in accordance with the first embodiment.

The motor 1 of FIG. 1 comprises a housing in four parts 1A, 1B, 1C and 1D in the inside of which a rotating cylinder block 10 is mounted able to rotationally drive a spindle 12, supported in relation to part 1A of the housing by bearings 14. Inside part 1C of the housing an internal distributor 16 is arranged having distribution ducts with which the cylinders 18 of the cylinder block can be successively brought into communication via their cylinder ducts 19, during the rotation of the cylinder block, the distributor being fixed in rotation in relation to the housing. The pistons 17 of the cylinder block 10 are supported by the corrugated cam 4, formed at the internal periphery of part 1B of the housing. Although the motor shown is of the fixed housing type with a rotating spindle, the invention also applies to rotating housing motors.

The motor comprises at least two main ducts C1 and C2 (see FIG. 2), serving respectively as motor admission and exhaust. For a closed circuit, these main ducts are connected respectively to the banking up and inlet openings of a pump by two respective main ducts L1, L2. In the case of a closed circuit, the connection between the main ducts of the motor and the main ducts of the circuit is generally direct. In the case of an open circuit, this connection is generally achieved by a main selector which can be operated in order to reverse this connection and, consequently, reverse the direction of rotation of the motor rotor.

Figure 2:
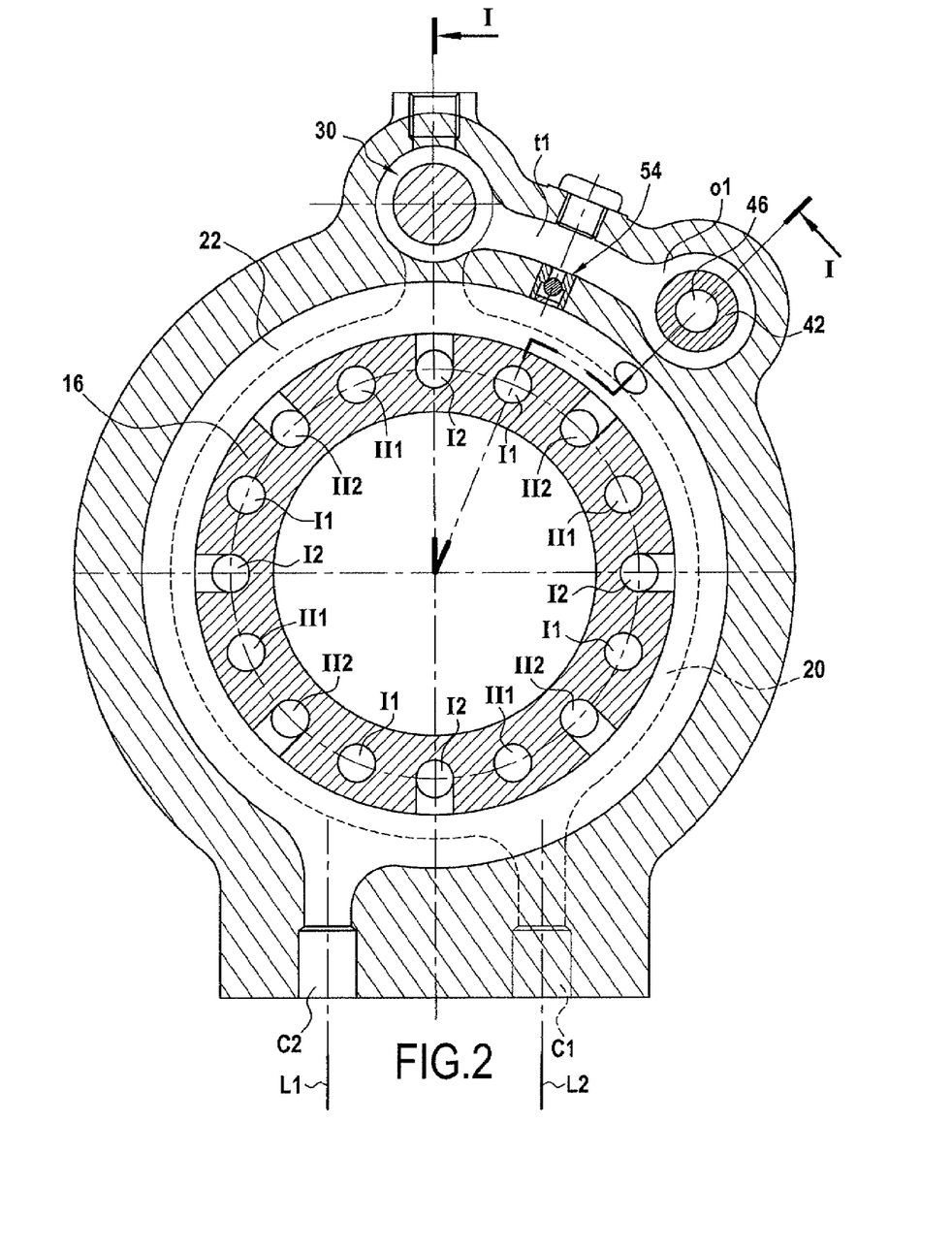
FIG. 2 is a cutaway view along the line II-II of FIG. 1.

In this particular case, the motor shown comprises three distribution grooves 20, 21 and 22, respectively.

In order to be able to function with its two different displacement volumes, the motor has two series of distribution ducts each having two groups of ducts. So, by referring to FIG. 2, a cross-section can be seen through the distributor 16, which allows the various distribution ducts to be shown and which passes through the groove 22, while the grove 20 is shown by a broken line. On this cross-section the distribution ducts of the first group of the first series are denoted by I1, and the distribution ducts of the second group of the first series by the reference I2, the distribution ducts of the first group of the second series by the reference II1 and those of the second group of the second series by the reference II2.

So, the distribution ducts I1 are permanently connected to the groove 20 of the distributor, the ducts II1 are connected to the groove 21, and the ducts I2 and the ducts II2 are connected to the groove 22.

Moreover, as can be seen from FIG. 2, the first main duct C1 is permanently connected to the groove 20, while the second main duct C2, is permanently connected to the groove 22.

The motor of FIGS. 1 and 2 is fitted with a displacement selector 30 comprising a drawer 32, which moves in an axial bore hole 34 and which has a selection groove 33. The grooves 20 and 21 of the distributor are connected to the bore hole 34 in two axially different positions, by a connecting duct I20 and a connecting duct I21 respectively. The displacement selector 30 is shown in FIG. 1 in its small displacement position, in which the groove 20 isolated from the groove 21. So, the first group of distribution ducts of the first series I1 is connected to the main duct C1 whilst being isolated from the ducts II1 of the first group of the second series. For its part the groove 33 of the drawer 32 connects the groove 21 to a first section of the by-pass connection t1 which also opens out into the bore hole 34. The openings of the connecting ducts I20, I21 and those of the section t1 are arranged one after another in the bore hole 34, in the direction of movement S of the latter from its large displacement position (not shown) to its small displacement position.

It will be understood that when the drawer 32 is in its large displacement position, in which its end 32A abuts with the bottom 34A of the bore hole 34, its groove 33 connects the grooves 20 and 21 of the distributor via the respective connection ducts 120 and 121. In this case, the first groups of distribution grooves of the first and second series I1, II1 are connected together by this groove 33 and are thus connected to the main duct C1, while via groove 22, the second groups of distribution ducts of the first and second series I2, II2 are connected to the main duct C2 whilst being isolated from the other groups of distribution ducts.

The connecting section of by-pass t1 serves, in the small displacement position of the selector 30, to connect the first group of distribution ducts of the second series II1 (which is connected to the groove 21) with the second distribution groups of the first and second series I2, I22 (which are connected to the groove 22).

In fact, the motor of FIG. 1 comprises a by-pass selector 40 which has a by-pass connection comprising, on the one hand, the first connecting section of by-pass t1 and, on the other, a second connecting section of bypass t2. The by-pass selector comprises a drawer 42 which is arranged in a bore hole 44 having a first opening o1 connected with a first connecting section of by-pass t1 (see in particular FIG. 2) and a second opening o2 connected with the second section of connection t2.

The first section of connection t1 can be connected to the first group of distribution ducts of the second series II1 via the displacement selector when the latter is in its small displacement position since, as mentioned above, these distribution ducts II1 are then in communication with section t1 via the groove 33 of the drawer 32. As can be seen from FIG. 1, the second section of connection t2 is, for its part, connected to the groove 22 of the distributor, allowing it to be connected to the second groups of distribution ducts I2, II2. In its bypass position shown in FIG. 1, the drawer 42 of the by-pass selector allows an unrestricted connection between the sections t1 and t2. As a consequence, the first group of distribution ducts of the second series II1 is then connected without restriction with the second groups of distribution ducts I2, II2, such that the motor functions in normal small displacement.

The drawer 42 has a blind hole 46 which is permanently connected to the first opening o1 and a series of through-holes 48 which are arrangement successively along the drawer in such a way as to connect the blind hole 46 with the outer periphery of this drawer. The section of these through-holes 48 decreases along the drawer in the direction towards the opening o1.

Figure 3:
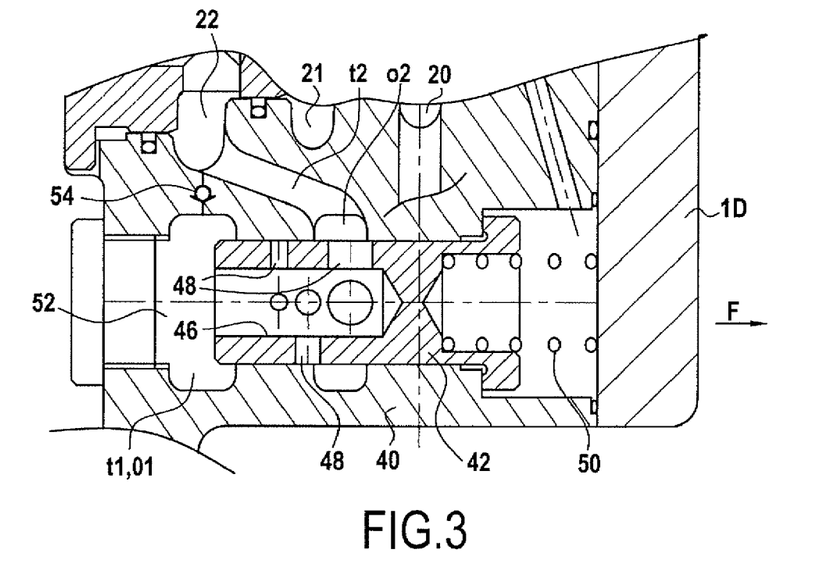
FIG. 3 is an enlarged view of detail III of FIG. 1, in an unrestricted bypass configuration.

In FIGS. 1 and 3, the drawer 42 occupies a first position in which at least one unrestricted through-hole 48 is opposite the second opening o2 in order to thereby establish, via the intermediary of the blind hole 46, a substantially free communication between the openings o1 and o2. This unrestricted through-hole is one of the through-holes 48 that has a sufficiently large section to not create significant load losses during circulation of the fluid between the openings o1 and o2. FIG. 1 shows how it is a case of the widest through-hole of the series of through-holes 48. The first position of the drawer 42 is thus the one in which it permits an unrestricted by-pass connection, thereby allowing operation of the motor at small displacement when the selector 30 is in the small displacement position.

Figure 4:
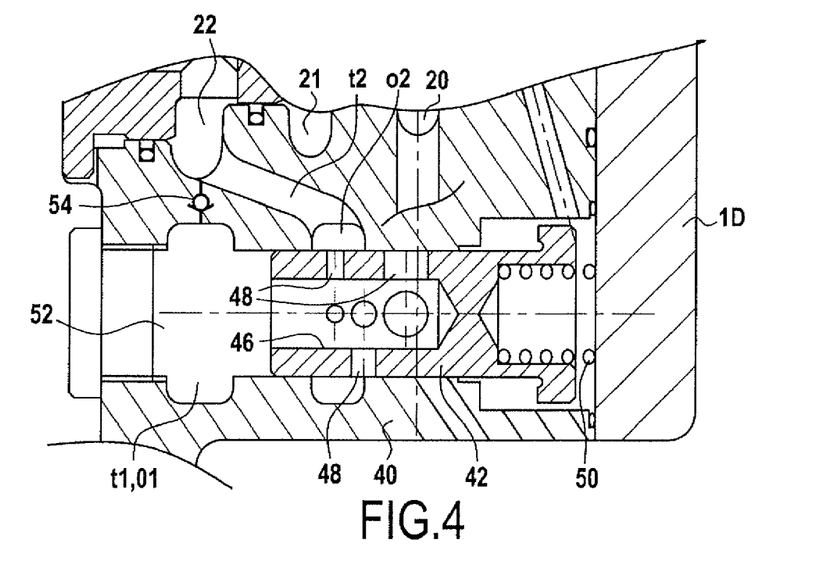
FIG. 4 is a view identical to that of FIG. 3, showing a restricted bypass configuration.

From this first position, the drawer 42 can be moved in the direction F in order to occupy a second position in which the outer periphery of this drawer occludes part of the second opening o2 to establish a restricted communication between openings o1 and o2. In this particular case, as shown in FIG. 4, this second position is the one in which the communication between openings o1 and o2 is achieved via the intermediary of at least one through-hole 48 of limited section (one of those that are the closest of the free end 42A of the drawer 42), selected in such a way as to cause a significant loss of load during circulation of the fluid between openings o1 and o2.

So, in this second position, the by-pass selector restricts the bypass connection necessary for operation of the motor at small displacement.

The by-pass selector 40 is constantly attracted to its unrestricted by-pass position by, in this particular case, a return spring 50 which permanently attracts the drawer 42 in the opposite direction to the direction of movement F.

In this particular case, on the motor of FIG. 1, the two groups of distribution ducts of the first and second series I2, II2 are connected together permanently by the groove 22 and the means of control of the movement of the drawer 42 comprising a control chamber 52 which is connected to the first group of distribution ducts of the second series II1 via the intermediary of section t1, of the selector 30 and the groove 21. These means of control also comprise the abovementioned return spring, the effect of which is antagonistic towards the pressure in the chamber 52.

In this particular case, the control chamber 52 comprises the part of the end of the bore hole 44 of the selector 40 into which the opening o1 and the blind hole 46 of the drawer open out. So, whatever the pressure in the second main duct C2, a pressure is maintained in the first distribution ducts II1 of the second series which is at most equal to the value corresponding to the calibration of the spring 50. This value will advantageously be adjusted, that is to say be equal to or slightly higher than the value of the supercharging pressure of the motor.

When the motor is of the type shown, that is to say comprising only three distribution grooves for two displacements, it has a preferential direction of operation in which the second main duct C2 to which the second group of distribution ducts of the first series and the two groups of distribution ducts of the second series at small displacement are connected is the main exhaust duct. The means of control that have just been described allow a situation to be created in which, although the motor is operating at small displacement in its preferred direction and hydrostatic braking is triggered, thereby causing an increase in pressure in the return branch of the circuit which is connected to the main duct C2, the by-pass connection is automatically restricted, in such a way as to add to the hydrostatic braking torque that resulting from the pressure thereby created between the first group of distribution ducts of the second series II1 and the second groups of distribution ducts. Apart from such a braking situation, the pressure in this branch is normally low since the duct C2 serves as the exhaust in the preferred direction.

The device according to the invention, however, advantageously comprises a non-return valve to sort-circuit the restriction of the by-pass connection in particular for operation of the motor at small displacement and in its non-preferred direction of movement, the situation in which the main duct C2 serves as the admission. In this particular case, this non-return valve 54 is shown in FIG. 2. It is arranged between the distribution groove 22 and the first section of the by-pass connection t1. To the extent that, as indicated previously, the second section of the by-pass connection t2 is permanently connected with the groove 22, this non-return valve serves to connect together the sections t1 and t2. The arrangement of this valve is such as to allow only an unrestricted or substantially unrestricted circulation of fluid in the direction from the first connecting section of by-pass t1 (that is to say from the first group of distribution ducts of the second series II1) towards the second section of by-pass connection t2 (that is to say towards the two groups of distribution ducts I2, II2).

As a variant, it is possible to arrange on such a connection a valve, controlled, for example, by a solenoid, which can be controlled by the operator when, with the motor at small displacement, he operates the latter in its non-preferred direction of operation.

It should be noted that the presence of such a valve is a preferred variant, but that this could also be refrained from if the operation of the motor at small displacement (fast operation) was quite simply prohibited in the non-preferred direction. For example, reversing of a vehicle with rapid operation is rarely of benefit.

Figure 5:
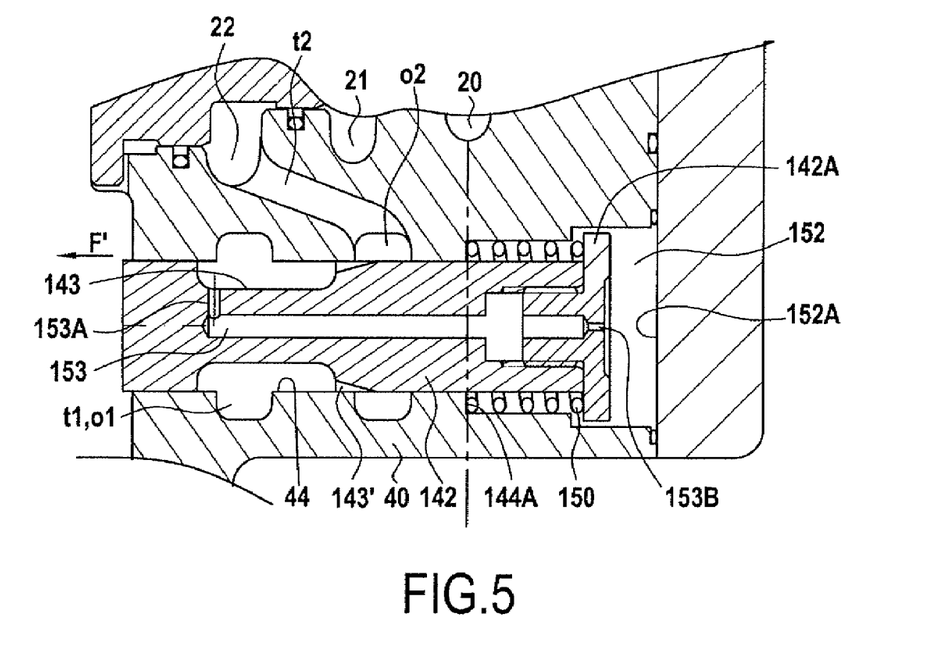
FIG. 5 is a view identical to that of FIG. 4, showing a variant design of the by-pass valve.

FIG. 5 shows an embodiment of the drawer of the by-pass selector 40. According to this variant, the drawer 142 of this selector, arranged in the bore hole 44, has at its outer periphery a groove 143 whose edge located on the side of the opening o1 of the first connecting section of by-pass t1 is provided with bevels 143'. These bevels are created in the form of recesses whose section decreases in the opposite direction to the direction of movement F' of the drawer towards its second position in which the by-pass connection is restricted.

In FIG. 5, the drawer 142 is shown in this restricted by-pass connection position, and it can be seen that the connection between the first and second by-pass connection sections t1 and t2 is created by means of the bevels 143' which allow only a restricted circulation between said sections.

In this example, the means of control of the movement of the drawer 142 comprises a control chamber 152 created at the end of the drawer opposite the opening o1. This chamber is fed via a pilot duct 153 created inside the drawer and communicating, on the one hand, with the groove 143 via a through-hole 153A and, on the other, with the control chamber via a through-hole 153B created in a plug 142A arranged at the end of the drawer 142. These means of control also comprise a return spring 150 which is arranged between a shoulder 144A of the bore hole and a flanged section of the plug 142A opposite this shoulder. It will be understood that the spring constantly attracts the drawer in the opposite direction to the direction F'.

In the unrestricted bypass position of the selector 40, the plug 142A is arranged substantially against the bottom 152A of the control chamber 152, under the effect of the spring 150. In this position, the groove 143 is opposite the opening o2 and the pilot groove 153, as well as the chamber 152, can thus be fed by the fluid from the return branch, originating from the two groups of distribution ducts I1, II2 to which the section t2 is constantly connected via the groove 22. So, when the pressure in the return branch, that is to say in the ducts I2, III2 exceeds the calibration of the spring 150, the drawer can be moved in the direction F' in order to restrict the by-pass connection and thereby maintain the pressure downstream of this drawer, that is to say in the section t1 connected to the first group of distribution ducts III of the second series, at the level of the calibration of the spring 150. As the bevels 143' have a progressive section, the restriction of the by-pass connection becomes more pronounced as the drawer moves in the direction F' as a function of the increase in pressure in the return branch.

The motor that has just been described is of the type comprising three distribution grooves, the second groups of distribution grooves I2, II2 being "merged" in the third groove 22. Under these conditions, the second section of the by-pass link t2 is connected to the second groups of distribution ducts of the first and second series I2, II2. The invention also applies to a motor comprising a distribution groove for each of the groups of each series of distribution ducts, in which case the distribution ducts I2 and II2 would be connected to different ducts. In this case, the section t2 is connected to at least one of the second groups of distribution ducts, preferably that of the second series II2.

In the example that has just been described, the displacement selector and the by-pass selector are two different selectors. By reference to FIGS. 6, 7A, 7B and 7C a description is now provided of another embodiment in which these selectors form a common selector.

Figure 6:
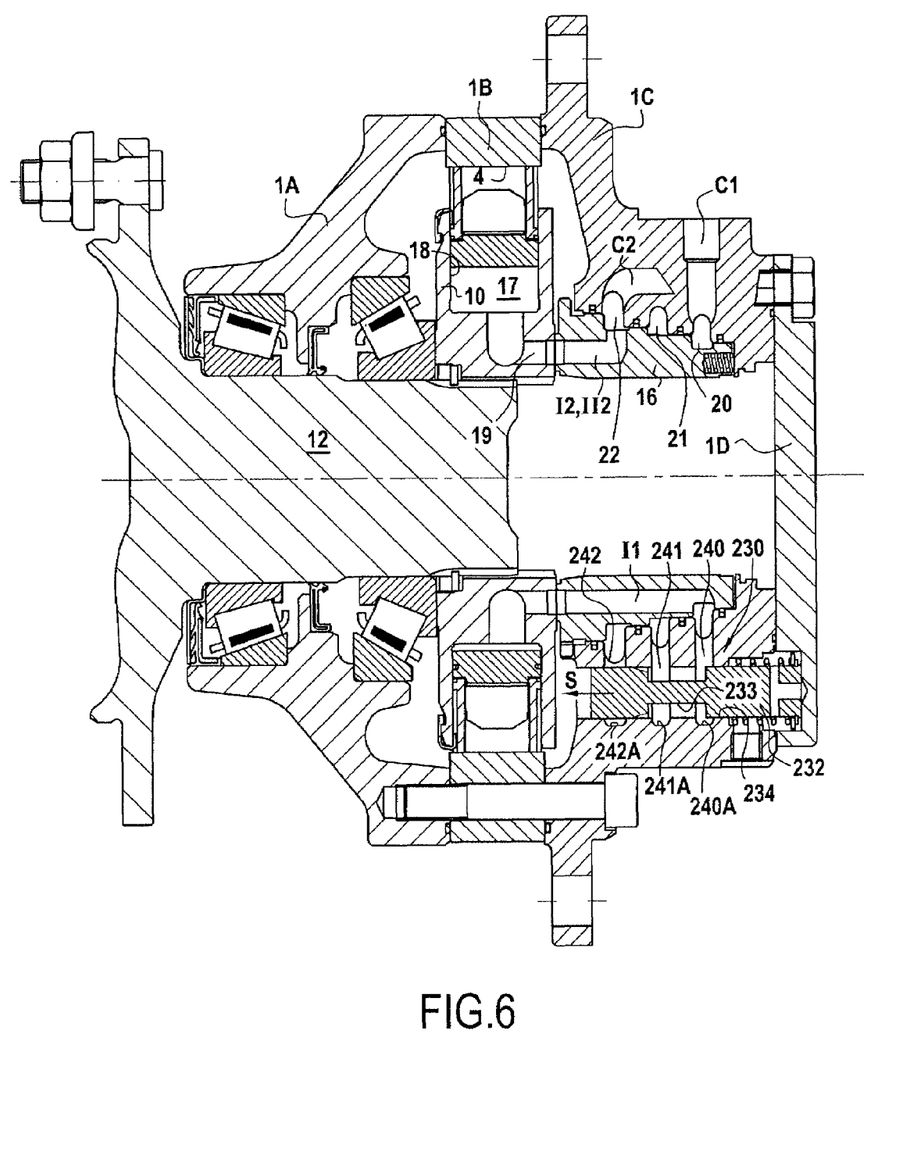
FIG. 6 is a view identical to that of FIG. 1 for the second embodiment.

Overall, the motor in FIG. 6 is of the same type as that in FIG. 1 and the elements that do not change are identified by the same references. In particular, the first main duct C1 is connected to the first distribution groove 20 to which the distribution ducts of the first group of the first series I1 are connected, while the second main duct C2 is connected to the groove 22 to which the two groups of distribution ducts I2, II2 are connected. The first group of distribution ducts of the second series is, for its part, connected to the central duct 21.

The common selector 230 comprises a drawer 232 in an axial bore hole 234 which has a first opening 240A connected to the first group of distribution ducts I1 of the first series, a second opening 241A connected to the first group of distribution ducts III1 of the second series and a third opening 242A connected to the second groups of distribution ducts I2, II2 of the first and second series. The bore hole comprises at least these three openings, with it being known that the opening 242A could only be connected to the ducts II2, in which case an additional opening could be connected to the ducts I2. These connections are created by connecting ducts, respectively 240, 241 and 242 which connect grooves 20, 21 and 22 to openings 240A, 241A and 242A, respectively, of the bore hole 234 arranged successively in the direction S of movement of this selector towards its small displacement position.

In FIG. 6, the drawer 232 is in its large displacement position and it can be seen that the groove 233 of this draw then brings into communication the distribution grooves 20 and 21, via the connection ducts 240 and 241 while the groove 22 is isolated from the other two. So, the first groups of distribution ducts I1, II2 are connected to the first main duct C1, and are isolated from the second groups of distribution ducts I2, II2 which are connected together by the groove 22. It will be understood that when the drawer 232 is moved in direction S until its outer periphery masks the opening of the connecting duct 240 and its groove 233 brings into communication with each other the connection ducts 241 and 242, the motor functions at its small displacement since the first group of distribution ducts of the second series III is then connected to the second groups of distribution ducts I2, II2.

Figure 7A:
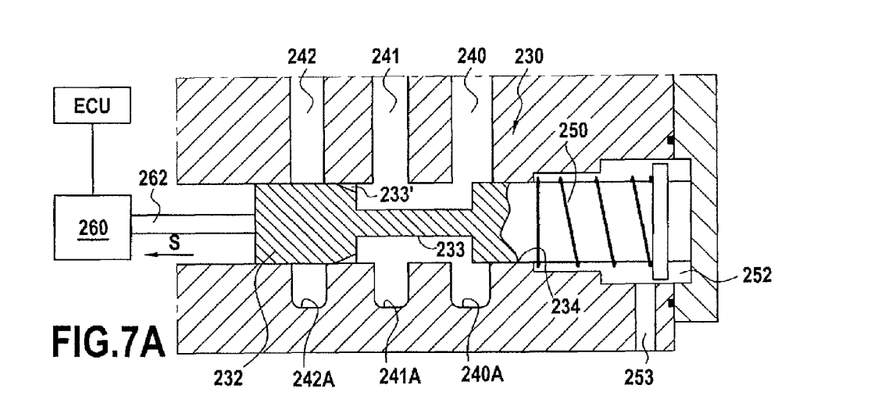
FIGS. 7A to 7C illustrate, in schematic view in axial section, the second embodiment of the invention using a common selector for the selection of the displacement and the bypass.
Figure 7B:
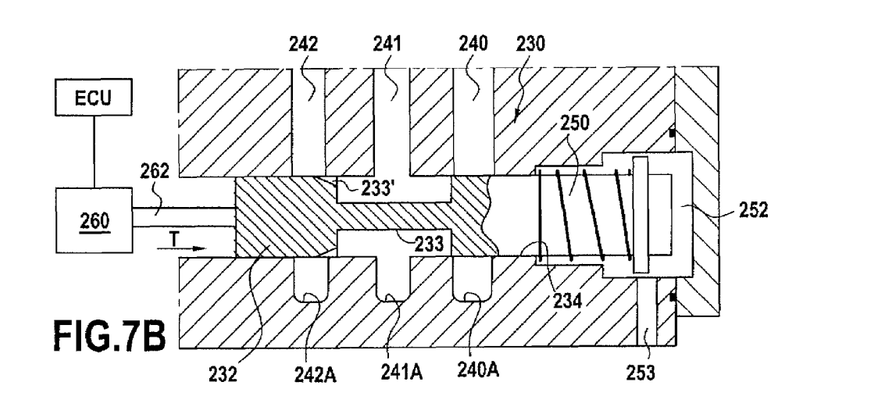
Figure 7C:
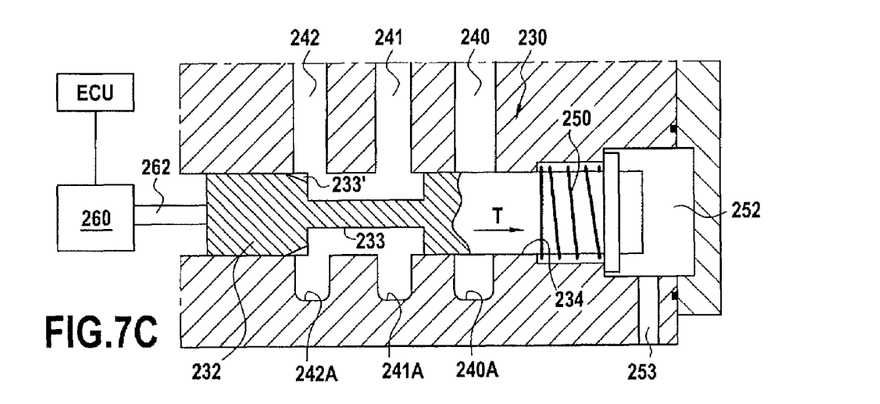

The large displacement position is shown in FIG. 7A, white the small displacement position is shown in FIG. 7C. Between these two positions, the drawer 232 can occupy a small displacement position with restricted bypass connection, as shown in FIG. 7B.

The by-pass connection that allows small displacement operation is created by bringing into communication the connecting ducts 241 and 242 via the groove 233 of the drawer as shown in FIG. 7C. From this position, in which it allows a substantially open by-pass connection, the selector 230 (or rather its drawer 232) can be moved to restrict this connection by a restriction. This is what is shown in FIG. 7B, from which it can be seen that the by-pass connection between the connecting ducts 241 and 242 only now operates via an edge of the groove 233 provided with bevels 233'. These bevels are formed by recesses 233', which link the groove 233 to the outer periphery of the drawer on the side of this groove away from the connecting groove 240, and the section of which shrinks in the direction S of movement of the drawer towards its large displacement position. Under these conditions, it can be understood that when the drawer 232 moves from its small displacement position shown in FIG. 7C in the direction T opposed to the direction S, it achieves an intermediate position shown in FIG. 7B in which the communication between the connection duct 242 and the groove 233 (and thus the link between ducts 242 and 241) now operates only via the bevels 233'. As these bevels are of small section, this connection is restricted.

In the example shown, as has been indicated, the motor is of the type with three distribution grooves, the second groups of distribution ducts being combined in groove 22. As a consequence, in its restricted by-pass position, the selector 230 establishes a restricted communication between the first group of distribution ducts of the second series II1 and the second groups of distribution ducts of the first and second series I2, II2.

A displacement selector of the same type is, however, possible for a motor in which each of the groups of distribution ducts of each series is connected to a different distribution groove (for example a motor with two operationally active displacements having four distribution grooves connected, respectively, to the distribution grooves I1, I2, II1 and II2). In this case, in the small displacement position, the two groups of distribution ducts of the second series, II1 and II2, are combined and are connected to a common enclosure via their respective distribution groove, while the two groups of distribution ducts of the first series I1, I2 are connected respectively to the main ducts C1 and C2. The common enclosure can be connected to one of the main ducts, preferably the main duct at the lowest pressure, as in FR 2 481 755 or to an auxiliary pressure enclosure, as in FR 2 606 092.

As has been stated, the restricted connection is in this particular case creased by bevels along one edge of the groove 233. As a variant, as shown in FIG. 8, it would be possible to use a drawer 332 whose corresponding edge of the groove 333 would be formed by a return 332' having a plurality of through-holes 2348, bringing into communication the outer periphery of the drawer and the groove 332 (via the internal section of the return 332', the dimensions of these through-holes decreasing in the direction S.

Figure 8:
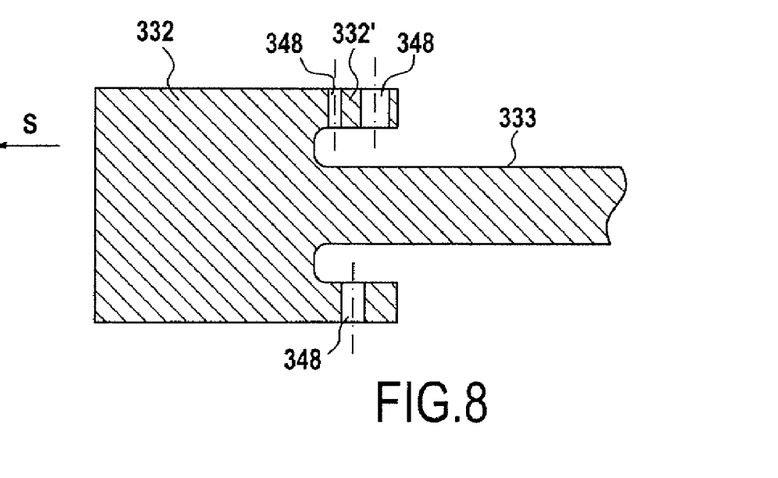
FIG. 8 is a part view of the selector of FIGS. 6 to 7C, for a design variant.

It can be seen that in the two cases in point, the restriction of the by-pass connection is progressive, according to the position of the common selector of FIGS. 6 to 8 or according to the position of the by-pass selector of FIGS. 1 to 5.

In the second embodiment shown in FIGS. 6 to 7C, the control means of the common selector comprise on the one hand a control chamber 252 supplied by a pilot duct 253 to cause a movement of the selector in the direction S, towards its small displacement position and, on the other, a return spring 250 constantly attracting the drawer of the selector in the direction T towards its large displacement position. These control means may be of a conventional type in order to control the movement of a selector for selecting the displacement.

In this particular case the selector also serves to restrict the by-pass connection as described. To do this, it is necessary have a controlled movement of the selector from its small displacement position shown in FIG. 7C to its restricted by-pass position shown in FIG. 7B. To do this, control means 260 can be provided to control the selector as a function of the travel of an operating element. This operating element could, for example, be the joystick used to drive the machine driven by the motor equipped with the inventive device, or a braking activation element such as a brake pedal or similar. The command can be relayed by an electronic control unit (ECU). For example, the activation of a braking command may cause the movement of a piston 262 of the type shown schematically in FIGS. 7A to 7C, in order to push the drawer 232 in the direction T, this piston normally being retracted in order to allow a conventional selection of the displacement when the by-pass connection has not been restricted.

Although these control means are only shown schematically in FIGS. 7A to 7C, it goes without saying that they also apply to the control of the movement of the drawer 42 of the by-pass selector 40 of FIG. 1 to 5.

Advantageously the device comprises a mechanical brake for the motor (not shown) which can be of any known type, using for example hydraulically and/or mechanically controlled friction brakes. In this case the braking control means of the motor are advantageously able, when the motor is at small displacement, to successively order a restriction of the by-pass connection in order to cause hydrostatic braking and activation of the mechanical brake. As was indicated previously, the braking can be relayed by an electronic control unit (ECU). In this case the latter knows the information according to which the motor is at small displacement and, when the braking is ordered, it can first order hydrostatic braking and then supplement this with mechanical braking.

For its part, the hydrostatic braking step can be ordered in a specific manner. In fact, the electronic control unit (ECU) can be parameterised to control a first hydrostatic braking step in order, as a function of the braking command and motor operation parameters, to order a first hydrostatic braking step performed by a change in the fluid delivery of the main ducts (by increasing the pressure in the return branch) and, as a function of the operational situation at the end of this first step, order a second hydrostatic braking step in which the by-pass connection is restricted in order to increase the available braking torque.

In the first hydrostatic braking step, the fluid delivery is in particular modified by an intervention on the circuit feed pump to reduce its displacement.

When there is a hydrostatic braking command, the movement of the by-pass selector (common selector or by-pass selector different from the displacement selector) can be achieved in such a way as to control a variable representative of the functioning of the vehicle driven by the motor according to a setpoint.

In particular, the variable representative of the operation of the vehicle driven by the motor can be the pressure or the delivery in one of the main ducts and/or the channels inside the motor, the output torque of the motor, its output speed, its output rpm, the speed of the vehicle, the distance covered by this vehicle, its position or distance in relation to a target, the acceleration or deceleration of the vehicle or of the motor, or also, for example, an operational parameter of the drive motor of the circuit feed pump (rpm, speed, motor torque, etc.), or a combination of the above parameters.

The representative variable can be calculated as a function of the operation of the various elements concerned, by the electronic control unit (ECU), but the device advantageously comprises means to detect the value of this variable or of the parameters used to calculate it.

The setpoint used for control can be memorised by appropriate means, and the abovementioned electronic control unit can then receive the value detected and/or calculated for the representative variable, compare this value with the setpoint memorised and issue a control signal for the by-pass selector in response to this comparison. The setpoint is chosen to allow the additional braking torque to be obtained allowing hydrostatic braking under favourable conditions even though the motor is in small active displacement.

In order to emit the by-pass selector control signal the device advantageously comprises a PID type regulation system.

The setpoint used for control is advantageously a variation law for the representative variable of the motor operation.

When the control is exerted over the pressure in the return branch, the latter is able to allow racing of the pump drive motor to be avoided by ensuring that this pressure does not exceed a defined value during hydrostatic braking.

The control used to operate the restriction of the by-pass connection can advantageously be used for ancillary functions such as assisting the cornering of a machine having two driving wheels on the same axle each driven by a motor equipped with a device according to that of the invention, since the control allows an increase in hydrostatic braking by then braking the internal cornering wheel. Another possible function is balancing the front/rear braking of the different driving wheels on the same machine, in order to increase where necessary the braking torque in one or more motors of a driving wheel so as to balance the braking over the various wheels, or also ABS type braking.

The invention is applicable in particular to motors supplied in closed circuit. The insertion of the restriction on the by-pass connection causes a loss of load and, as a consequence, an increase in the temperature of the hydraulic fluid. In this case it is important to dissipate the heat thereby caused and so it is advantageous for the circuit to be equipped with an exchange valve allowing redirection of a fluid that has been drawn off to a cooling system.

Although the designs that have just been described concern motors with radial pistons, the invention also applies to other types of motors, in particular to Gerotor motors having more than two different displacements, one of which may be short-circuited by the by-pass connection mentioned above, with internal recirculation of the fluid in the ducts thereby combined. In short a description has been given by reference to the drawings of motors with two operational displacements and just one displacement selection drawer, but the invention obviously applies to motors with a higher number of displacements, such as motors with three displacements and two displacement selection drawers.

In the motor that has just been described by way of example by reference to the drawings, the two main ducts C1 and C2 are able to be connected to each of the main ducts L1, L2 respectively, of a circuit that comprises a pressurised fluid source able to feed one of these main ducts and a fluid return to which the other main duct is connected. In closed circuit, this pressurised fluid source and this return are each of the two respective openings of the pumps. In open circuit, the fluid source is the output opening of the pump while the fluid return is a connection to a reservoir without pressure burden via the intermediary of a device capable of increasing the pressure on the fluid return in the braking phases (for example a speed limiter).

As has just been seen, in the large displacement position of the displacement selector, the first groups of distribution ducts of the first and second series I1, II1 are connected to one of the main ducts (C1) and the second groups of distribution ducts of the first and second series I2, II2 are connected to the other main duct (C2). In the small displacement position of the displacement selector, the first group of distribution ducts of the first series I1 is connected to one of the main ducts (C1), the second group of distribution ducts of the first series I2 is connected to the other main duct (C2), and the first group of distribution ducts of the second series II1 and the second group of distribution ducts of the second series II2 are connected to each other via the by-pass connection that has just been described.

Figure 9:
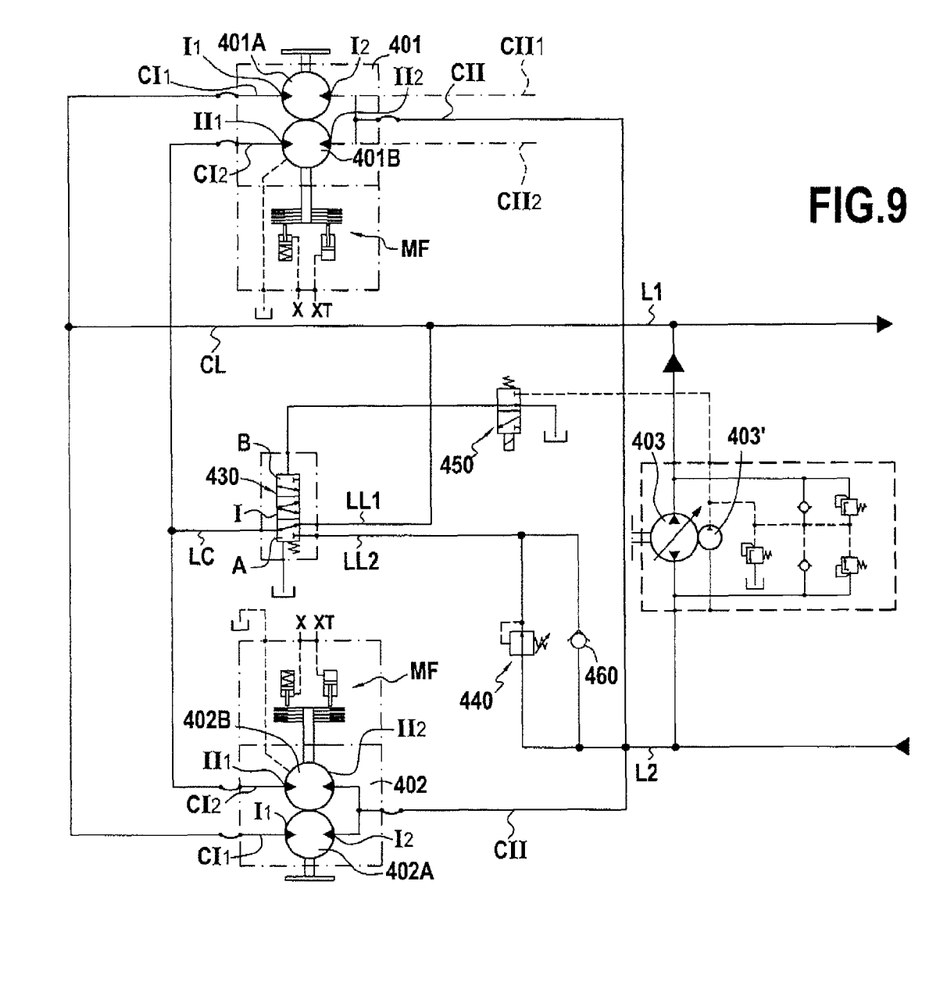
FIG. 9 shows a circuit using a device according to the invention for two motors.

The circuit in FIG. 9 shows the case where the inventive device is external to the motor.

More specifically, this circuit comprises two motors 401, 402, respectively, each having two operationally active displacements, symbolised respectively by the half-motors 401A and 401B, and the half-motors 402A and 402B.

The circuit comprises a main pump 403 which, as the circuit is of the closed type, has its two openings connected respectively to two main ducts L1, L2, which serve respectively as admission and exhaust for the motors 401 and 402 in the preferred direction (forward) of the vehicle.

The motor 401 has two series of distribution ducts. More specifically, the first series comprises a first group of ducts I1 and a second group of ducts I2, and the second series comprises a first group of ducts II1 and a second group of ducts II2. In the symbolic system adopted, these different groups correspond to the respective openings of the half-motors 401A and 401B.

The motor 401 has a first group of main ducts which comprises a first main sub-duct CI1 to which the first distribution ducts of the first series I1 are connected and a second main sub-duct CI2 to which the first distribution ducts of the second series II1 are connected.

The motor 401 also has a second main duct CII to which the second groups of distribution ducts of the first and second series I2, II2 are connected. This second main duct serves as the connection between the distribution ducts of the second groups of the first and second series and the second main duct L2. In place of this second main duct CII, the motor could have a second group of main ducts comprising a first and a second main sub-duct to which the second groups of distribution ducts of the first and second series I2, II2 respectively, would be connected. This is symbolised by mixed broken lines in FIG. 9, with the two main sub-ducts of this first group of main ducts being designated by CII1 and CII2 respectively.

The circuit comprises a displacement selector 430 which, in the example shown, is in its large displacement position. This selector 430 is inserted between the second main sub-duct CI2 of the first group of main ducts, which is therefore connected to the first main duct L1 via the intermediary of the selector 430, while the first main sub-duct CI1 of this group is directly connected to the same main duct L1 via a connection duct CL and the second main duct CII is for its part directly connected to the second main duct L2. The displacement selector 430 has a first channel connected to a connection duct LC, which is itself connected to the main sub-duct CI2, a second channel connected to a connection duct LL1 which is itself connected to the main duct L1, and a third channel connected to a connection duct LL2 which is itself connected to the main duct L2.

In its first extreme position A, which is its large displacement position to which it is constantly reverted, the selector 430 connects together its first and second channels, such that the main sub-duct CI2 is connected to the main duct L1, while its third channel is isolated from the first and second channels. In its other extreme position B, which is its small displacement position in which it can be controlled by a solenoid 450, the selector 430 connects together its first and third channels so that the main sub-duct CI2 is connected to the main duct L2, via the connection duct LL2.

So, in position A, large displacement, of the selector 430, the second main duct CII (or the second group of main ducts) is connected to the second main duct L2 and the two main sub-ducts CI1 and CI2 of the first group of main ducts are connected to the first main duct L1 while in position B, small displacement, of selector 430, the second main duct CII is connected to the second main duct L2, the first main sub-duct of the first group CI1 is connected to the first main duct L1 and the selector 430 connects the second main sub-duct CI2 of the first group to the second main duct L2.

It can be seen that between positions A and B the selector has an intermediate position I in which its three channels communicates with each other so that the motors are bypassed.

It can be seen that the connection duct LL2, which forms the by-pass link for the distribution ducts II1 and II2 of the second series, has mounted upon it a variable calibration pressure reducer 440 which forms a by-pass selector.

It will be understood that when this selector is in its rest position in which its through section is at a maximum, the by-pass connection is unrestricted.

When, on the other hand, it is commanded by the pressure downstream, to reduce this through section, the by-pass connection is restricted.

A non-return valve 460 allowing the passage of fluid only in the direction from the third channel of the selector 430 to the duct L1 is arranged in parallel to the by-pass selector 440. As a consequence, the fluid passes freely in this direction and is only restricted when the selector 440 is commanded to limit the passage of fluid from the duct L2 to the main sub-duct CI2. As a consequence, the by-pass connection of the distribution ducts of the second series is restricted solely in the event that the main duct L2 is the motor exhaust duct.

In the circuit shown, the second main duct L2 is permanently connected to the second distribution ducts of the first and second series, so that the case in which this duct corresponds to the motor fluid exhaust corresponds to the preferred direction of operation of the motor, that is to say generally the forward movement of the vehicle. In other words, the by-pass link can be restricted in forward motion of the vehicle but not in reverse motion of this thanks to the presence of the non-return valve 460.

The motor 402 is similar to the motor 401. It comprises in particular, as does the latter, two series of distribution ducts, each having two groups I1, II1 (these being connected respectively to the main sub-ducts CI1 and CI2 of the first group of main ducts), I2 II2 (these being connected to the second main duct CII).

The second main duct CII is connected to the second main duct L2, while the first main sub-duct of the first group CI1 is connected to the connection duct CL and the second main sub-duct of the first group CI2 is connected to the connection duct LC, which is itself connected to the first channel of the selector 430.

It will therefore be understood that the displacement selector 430 is common to the two motors so that, in its large displacement position A, it places these two motors simultaneously in large displacement while in its small displacement position B it places the two motors simultaneously in small displacement.

The motors 401 and 402 each comprise braking means MF of a type that is in itself known. The circuit also comprises a supercharging pump 403', connected to its various components in a way that is in itself known.

As indicated above in relation to the motor 401, the second group of main ducts of each motor could comprise two main sub-ducts, CII1 and CII2, respectively. In this case, in the large displacement position of the displacement selector, the two main sub-ducts of the first group CI1 and CI2 would be connected to the first main duct L1 of the circuit and the two main sub-ducts of the second group CII1 and CII2 would be connected to the second main duct L2. On the other hand, in the small displacement position of this selector, the first main sub-duct of the first group CI1 would be connected to the first main duct L1, the first main sub-duct of the second group CII1 would be connected to the second main duct L2, and the displacement selector would connect together the second main sub-duct of the first group CI2 and the second main sub-duct of the second group CII2 via the by-pass connection. In this case, it is possible to choose that in the small displacement position of the selector 430, the latter connects the second main sub-ducts of the first and second main groups CI2 and CII2 connecting these to one of the first and second main sub-ducts of the first group.

As indicated above, the circuit advantageously comprises two identical hydraulic motors, in which case the displacement selector and the means for restricting the by-pass connection (by-pass selector 440) are advantageously common to these motors.

In the example of FIG. 9, the by-pass selector is a pressure reducer controlled by the pressure downstream. It could however be operated as indicated above by reference to the previous diagrams, as a function of the travel of an operating element. In particular, the circuit can be equipped with means of control (Electronic Control Unit), ordering in succession the activation of the by-pass connection and activation of the mechanical brake of the motor(s). This selector can be operated to control the movement of a vehicle driven by the motor(s) according to a setpoint.

The invention claimed is:

1. Device for managing the operation of a hydraulic motor having at least two operationally active displacements and able to be connected to two main ducts, for admission and exhaust respectively, the motor comprising two series of distribution ducts each having a first and a second group of distribution ducts, the management device comprising a displacement selector able to occupy at least a large displacement position in which the first groups of distribution ducts of the first and second series are connected to one of the main ducts, while the second groups of distribution ducts of the first and second series are connected to the other main duct, and a small displacement configuring in which the first group of distribution ducts of the first series is connected to one of the main ducts, while the second group of distribution ducts of the first series is connected to the other main duct and a by-pass connection is provided between the first group of distribution ducts of the second series and the second group of distribution ducts of the second series, the device comprising a restriction capable, in the small displacement configuration, of restricting the by-pass connection.

2. Device according to claim 1, comprising a by-pass selector arranged in the by-pass connection which is able, from an initial position in which said selector allows a substantially freely open by-pass connection, to be moved in order to restrict said connection by a restriction.

3. Device according to claim 2, wherein the by-pass connection comprises a first connecting section able to be connected to the first group of distribution ducts of the second series and a second connecting section able to be connected to the second group of distribution ducts of the second series, and wherein the selector comprises a drawer arranged in a bore hole having at least a first and a second opening linked, respectively, with the first and with the second connecting sections such that the drawer is able, depending on its position, to establish a substantially free communication or a restricted communication between said sections.

4. Device according to claim 3, wherein the drawer has a blind hole permanently connected to the first opening and a series of through-holes, the section of which decreases along the drawer in the direction of the first opening and which connect this blind hole to the outer periphery of this drawer, the drawer being able to occupy a first position in which at least one unrestricted through-hole is opposite the second opening to establish a substantially free communication between the first and second openings and to occupy at least a second position in which the outer periphery of the drawer occludes part of the second opening to establish a restricted communication between said openings.

5. Device according to claim 2, comprising a displacement selector which can occupy a large displacement position in which the first groups of distribution ducts are able to communicate together while the second groups of distribution ducts are able to communicate together and occupy a small displacement position in which the first group of distribution ducts of the second series is able to communicate with at least the second group of distribution ducts of the second series.

6. Device according to claim 5, wherein the displacement selector and the by-pass selector are two different selectors and wherein, in its small displacement position, the displacement selector is able to establish a by-pass connection in which the by-pass selector is arranged.

7. Device according to claim 5, wherein the displacement selector and the by-pass selector form a common selector, able to occupy a small displacement position with restricted bypass in which said common selector establishes a restricted communication between the first group of distribution conduits of the second series and the second group of distribution conduits of the second series.

8. Device according to claim 7, wherein, in the small displacement position with restricted bypass, the common selector also establishes a restricted communication between the first group of distribution ducts of the second series and the second group of distribution ducts of the first series.

9. Device according to claim 7, wherein the small displacement position with restricted bypass is a position of the common selector which is in between the positions of large and small displacement of said common selector.

10. Device according to claim 7, wherein the common selector comprises a drawer in a bore hole having at least a first opening connected to the first group of distribution ducts of the first series, a second opening connected to the first group of distribution ducts of the second series and a third opening connected to the second group of distribution ducts of at least the second series, wherein in the large displacement position, said common selector establishes a communication between said first and second openings, isolating these from the third opening and wherein in the small displacement position, the common selector establishes a substantially free communication between the second and third openings isolating these from the first opening and, in the small displacement position with restricted by-pass, the common selector establishes a restricted communication between the second and third openings, isolating these from the first opening.

11. Device according to claim 2, wherein the restriction of the by-pass connection varies progressively, according to the position of the by-pass selector.

12. Device according to claim 2, wherein the by-pass selector is able to be operated as a function of the travel of an operating element.

13. Device according to claim 2, wherein, when there is a braking command, movement of the by-pass selector is operated in order to control a variable representative of the operation of a vehicle driven by the motor according to a setpoint.

14. Device according to claim 13, comprising means to memorize the setpoint and an electronic control unit able to receive the value detected for the representative variable, compare this value with the setpoint memorized and emit a control signal for the bypass selector in response to this comparison.

15. Device according to claim 14, comprising, for emitting the control signal, a PID type regulation system.

16. Device according to claim 13, wherein the setpoint is a variation law for the variable representing the motor operation.

17. Device according to claim 1, comprising a displacement selector which can occupy a large displacement position in which the first groups of distribution ducts are able to communicate together while the second groups of distribution ducts are able to communicate together and occupy a small displacement position in which the first group of distribution ducts of the second series is able to communicate with at least the second group of distribution ducts of the second series.

18. Device according to claim 17, wherein said second groups of distribution ducts are able to communicate together in both positions of the displacement selector.

19. Device according to claim 18, comprising a displacement selector which can occupy a large displacement position in which the first groups of distribution ducts are able to communicate together while the second groups of distribution ducts are able to communicate together and occupy a small displacement position in which the first group of distribution ducts of the second series is able to communicate with at least the second group of distribution ducts of the second series.

20. Device according to claim 19, wherein the displacement selector and the by-pass selector are two different selectors and wherein, in its small displacement position, the displacement selector is able to establish a by-pass connection in which the by-pass selector is arranged and wherein in the small displacement position of the displacement selector, the first connecting section is connected to the first group of distribution ducts of the second series and the second section is connected to at least the second group of distribution ducts of the second series.

21. Device according to claim 1, comprising a mechanical brake of the motor and wherein, when the motor is in small displacement operation, braking of the motor is operated so as to successively order a restriction of the by-pass connection and activation of the mechanical brake.

22. Device according to claim 1, wherein braking of the motor is operated as a function of a braking command and a motor operation parameters, so as to order a first step of braking in which the fluid delivery in the main ducts is modified and, as a function of the operational situation of the motor at the end of this first step, so as order at least a second braking step in which the by-pass connection is restricted.

23. Device according to claim 2, wherein the two groups of distribution ducts of the first and second series are permanently connected together, and the by-pass selector comprises a drawer whose movement is controlled by, on the one hand, a control chamber connected to the first group of distribution ducts of the second series and on the other hand, a return spring with an antagonistic effect on that of the pressure within said chamber.

24. Device according to claim 23, comprising a non-return valve able to allow an unrestricted connection between said first and second sections in the direction of circulation of the fluid from the first group of distribution ducts of the second series towards the second groups of distribution ducts.

25. Hydraulic circuit comprising at least a hydraulic motor with two main ducts, able to be connected respectively to each of the main ducts, a device for managing the operation of said motor according to claim 1, a pressurized fluid source able to feed one of the main ducts, and a fluid return to which the other main duct is connected, in which circuit, in the large displacement position of the displacement selector the first groups of distribution ducts of the first and second series are connected to one of the main ducts and the second groups of distribution ducts of the first and second series are connected to the other main duct, while, in the small displacement position of the displacement selector, the first group of distribution ducts of the first series is connected with one of the main ducts, the second group of distribution ducts of the first series is connected to the other main duct and the first group of distribution ducts of the second series and the second group of distribution ducts of the second series are connected together by said bypass connection.

26. Hydraulic circuit comprising at least a hydraulic motor having a first group of main ducts comprising a first and a second main sub-duct to which the first groups of distribution ducts of the first and second series are connected, and a second group of main ducts, comprising at least a main duct to which the second groups of distribution ducts of the first and second series are connected a device for managing the operation of said motor according to claim 1, a pressurized fluid source able to feed one of the main ducts and a fluid return to which the other main duct is connected, in which circuit, in the large displacement position of the displacement selector, the two main sub-ducts of said first group are connected to the first main duct and the second group of main ducts is connected to the second main duct, while in the small displacement position of the displacement selector, the second group of main ducts is connected to the second main duct, the first main sub-duct of the first group is connected the first main duct and the displacement selector connects the second main sub-duct of the first group to the second main duct via said bypass connection.

27. Hydraulic circuit according to claim 26, comprising two identical hydraulic motors and in which the displacement selector and the means of restriction of the bypass connection are common to said motors.

28. Hydraulic circuit according to claim 26, wherein the restriction of the bypass connection comprise a bypass selector able to restrict the circulation of fluid in said connection in one direction of circulation, while the circulation of fluid in the other direction of circulation is unrestricted.

29. Hydraulic circuit comprising at least a hydraulic motor having a first group of main ducts comprising a first and a second main sub-duct to which the first groups of distribution ducts of the first and second series respectively are connected, and a second group of main ducts, comprising a first and a second main sub-duct to which the second groups of distribution ducts of the first and second series respectively are connected, a device for managing the operation of said motor according to claim 1, a pressurized fluid source able to feed one of the main ducts and a fluid return to which the other main duct is connected, in which circuit, in the large displacement position of the displacement selector, the two main sub-ducts of said first group are connected to the first main duct and the two main sub-ducts of said second group are connected to the second main duct, while in the small displacement position of the displacement selector, the first main sub-duct of the first group is connected to the first main duct, the first main sub-duct of the second group is connected to the second main duct and the displacement selector connects the second main sub-duct of the first group to the second main sub-duct of the second group via said bypass connection.

30. Circuit according to claim 29, in which, in its small displacement position, the displacement selector connects the second main sub-ducts of the first and second group of main ducts to one of the first and second main sub-ducts of the first group.

* * * * *